Nov. 16, 1965     D. E. RUNKLE     3,217,516
UNIVERSAL JOINT
Filed Aug. 26, 1963     2 Sheets-Sheet 1
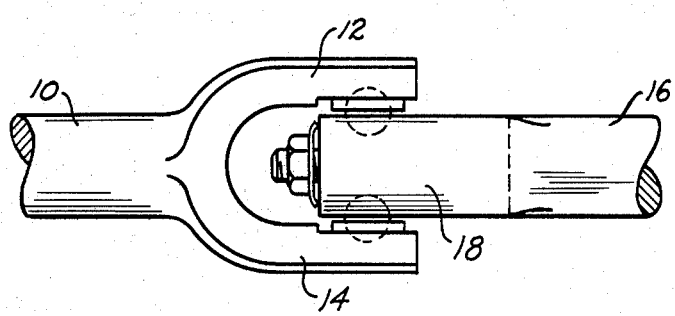
FIG_1
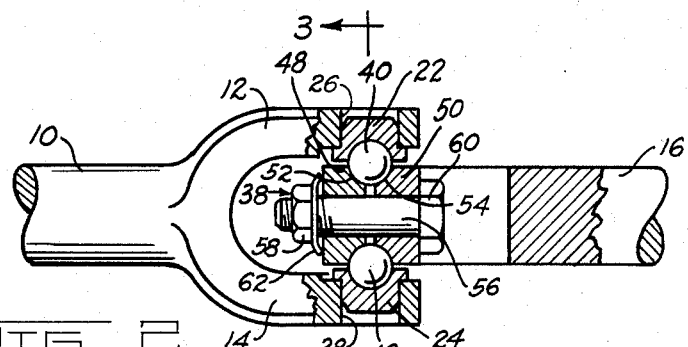
FIG_2
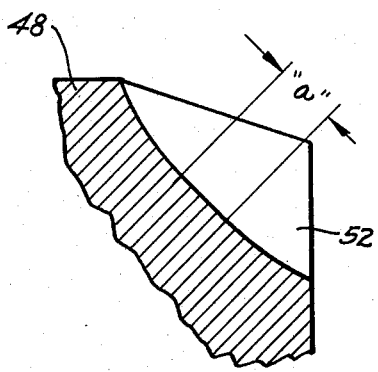
FIG_5
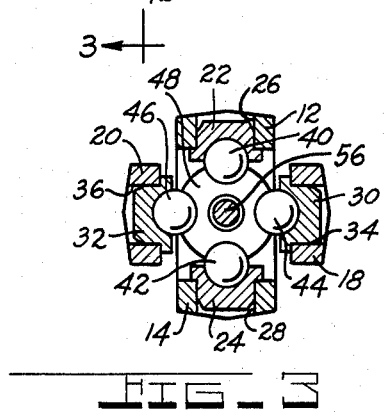
FIG_3
INVENTOR.
DEAN E. RUNKLE.
BY
*William N. Antonis*
ATTORNEY.

Nov. 16, 1965     D. E. RUNKLE     3,217,516
UNIVERSAL JOINT
Filed Aug. 26, 1963     2 Sheets-Sheet 2
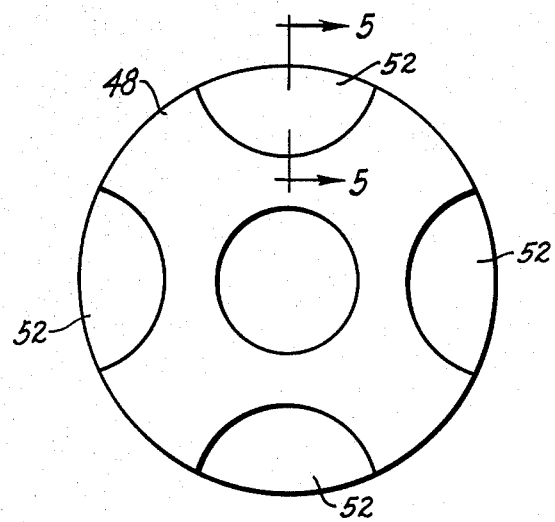
FIG_4
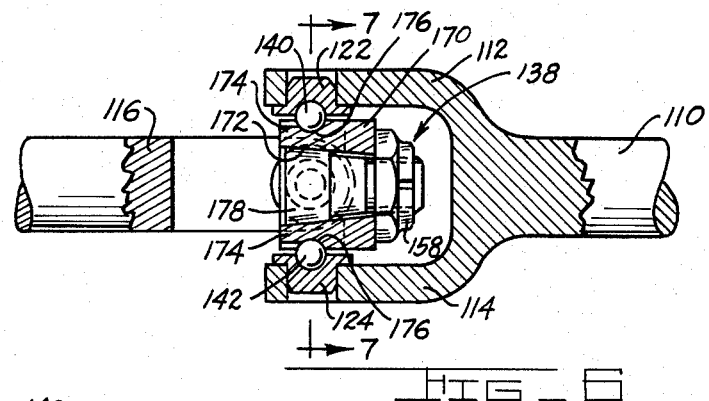
FIG_6
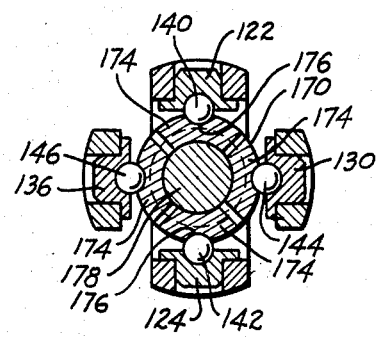
FIG_7
INVENTOR.
DEAN E. RUNKLE.
BY
*William N. Antonis*
ATTORNEY.

United States Patent Office 3,217,516
Patented Nov. 16, 1965

3,217,516
UNIVERSAL JOINT
Dean E. Runkle, South Bend, Ind., assignor to The Bendix Corporation, South Bend, Ind., a corporation of Delaware
Filed Aug. 26, 1963, Ser. No. 304,551
9 Claims. (Cl. 64—17)

This invention relates to universal joints and more particularly to a universal joint for use in a steering column.

More specifically it is an object of this invention to provide a universal joint which can be inserted in a two piece steering column so that the driver of a vehicle can adjust the steering wheel and column to any position which is deemed to be comfortable during operation of the vehicle.

Another object of the invention is to provide a universal joint of substantial strength which is relatively small in size.

A further object of this invention is to provide a universal joint which is free from backlash and friction losses.

A still further and important object of this invention is to provide, in a universal joint consisting of a pair of forked members which are positioned at right angles with respect to each other, an adjustable coupling mechanism for joining the forked members which will permit the elimination of backlash and frictional losses.

The above and other objects, features, and advantages of the invention will become apparent from the following description taken in connection with the accompanying drawings which form a part of this invention and in which:

FIGURE 1 is a side view of the universal joint;
FIGURE 2 is a view, similar to FIGURE 1, with portions thereof shown in section;
FIGURE 3 is a sectional view taken along line 3—3 of FIGURE 2;
FIGURE 4 is a plan view of one of the components of the coupling mechanism;
FIGURE 5 is a sectional view taken along line 5—5 of FIGURE 4;
FIGURE 6 is a sectional view, similar to FIGURE 2, showing another embodiment of the universal joint; and
FIGURE 7 is a sectional view taken along line 7—7 of FIGURE 6.

Referring to FIGURES 1–3, it will be noted that numeral 0 indicates a forked shaft member having a pair of arms 12 and 14 located at one end thereof, and that numeral 16 indicates a second similar forked shaft member having a pair of arms 18 and 20 also located at one end thereof. Diametrically opposed inwardly facing socket seats 22 and 24 are press fit into drilled holes 26 and 28 respectively located in arms 12 and 14. Similarly, diametrically opposed inwardly facing socket seats 30 and 32 are press fit into drilled holes 34 and 36 respectively located in arms 18 and 20. It will be noted that socket seats 22 and 24 are centered in the same plane with socket seats 30 and 32, but are located at right angles with respect thereto.

The adjustable coupling mechanism, indicated generally by the numeral 38, includes two pairs of diametrically opposed balls 40, 42, 44 and 46 which have a portion thereof received in socket seats 22, 24, 30 and 36, respectively, and a pair of axially aligned washer-like elements 48 and 50 having portions 52 and 54, respectively, of the inner ball seats formed on the adjacent edges thereof, as shown in FIGURES 2 and 4. A flat surface portion "a," as indicated in FIGURE 5, is provided on each of the inner ball seat portions 52 and 54 for purposes to be subsequently explained.

Also included as part of the coupling 38 is a bolt 56 extending through the washer-like elements 48 and 50 and a torque nut 58 which threadedly engages the end of the bolt. Thus, it will be seen that the washer-like elements are confined between the torque nut 58 and bolt head 60. A Belleville washer 62 is located between the torque nut 58 and element 48.

With this novel arrangement of parts it will be seen that it is possible to achieve and control any desired preload level simply by adjusting, that is, by rotating the nut 58 within a given torque range. Thus, if the nut 58 is tightened, washer-like elements 48 and 50 will be caused to move towards each other. Such movement of the elements 48 and 50 will cause, by virtue of the flat surface "a" on each of the inner ball seat portions 52 and 54, concurrent movement of all of the balls towards their respective socket seats. In this manner it is possible to adjust the coupling mechanism 38 to any predetermined preload level and to maintain this preload level for a given period of time by subsequent adjustments, if necessary.

In FIGURES 6 and 7, which illustrates another embodiment of the invention, like parts are generally designated by like numerals plus 100. In this embodiment the adjustable coupling mechanism 138 also includes two pairs of diametrically opposed balls, 140, 142, 144 and 146 which have a portion thereof received in socket seats 122, 124, 130 and 136, respectively. Instead of the previously described washer-like elements this embodiment includes an axially slotted sleeve-like element 170, having a tapered bore 172 and four radially movable fingers 174, each of which contains an inner ball seat 176 for receiving one of the balls 140, 142, 144 and 146. Located within the bore 172 is a tapered pin 178 having a threaded end extending therefrom for receiving a torque nut 158 which abuts the end of the sleeve-like element 170. Thus, with this arrangement, if the nut 158 is tightened, tapered pin 178 will move axially with respect to the sleeve-like element 170 and will thereby cause concurrent movement of the fingers 174 in a radial direction. Such movement will, of course, urge the balls 140, 142, 144 and 146 towards their respective socket seats.

The advantages and many applications of a universal joint which can be adjusted and maintained substantially free of backlash and friction losses will be obvious to those skilled in the art. Furthermore, although this invention has been described in connection with certain specific embodiments, it will be obvious to those skilled in the art that various changes may be made in the form, structure and arrangement of parts without departing from the spirit of the invention.

Accordingly, I do not desire to be limited to the specific embodiments disclosed herein primarily for purposes of illustration, but instead desire protection falling within the scope of the appended claims.

Having thus described the various features of the invention, what I claim as new and desire to secure by Letters Patent is:

1. A universal joint comprising two members capable of being rotated with their axes angularly disposed with respect to one another, a pair of spaced arms located at the end of each of said rotatable members, diametrically opposed inwardly facing socket seats located in the arms of each of said rotatable members, said socket seats of one of said members being centered in the same plane with the socket seats of the other of said members but at right angles with respect thereto, and adjustable coupling means for joining said rotatable members, said coupling means including two pairs of diametrically opposed balls each having a portion thereof received in one of said socket seats, torque transmitting center retaining means having separate and distinct inner ball seats for receiving each of said balls and preventing contact therebetween, and means operatively connected to said torque transmitting center retaining means for causing movement thereof in a direction tending to simultaneously urge all of said balls against said socket seats.

2. A universal joint, as defined in claim 1, wherein said socket seats are press fit into drilled holes located in the arms of each of said rotatable members.

3. A universal joint, as defined in claim 1, wherein said center retaining means comprises a pair of axially aligned washer-like elements each having a portion of said inner ball seats formed on the adjacent edges thereof, said axially aligned washer-like elements being caused to move towards each other by the means operatively connected thereto.

4. A universal joint, as defined in claim 3, wherein the means operatively connected to said washer-like elements for causing movement thereof towards each other comprises a bolt extending through said washer-like elements and a torque nut threadedly engaging the end of said bolt for confining the washer-like elements between the bolt head and nut and for causing movement of said washer-like elements upon rotation of said nut.

5. A universal joint, as defined in claim 4, which includes a Belleville washer located between said torque nut and the adjacent washer-like element.

6. A universal joint, as defined in claim 3, wherein each portion of said inner ball seats contains a flat surface therein for causing movement of said balls towards said socket seats upon movement of said washer-like elements towards each other.

7. A universal joint, as defined in claim 1, wherein said center retaining means comprises an axially slotted sleeve-like element having four radially movable fingers each of which contains one of said inner ball seats, said fingers of said sleeve-like member being caused to move radially and towards said socket seats by the means operatively connected thereto.

8. A universal joint, as defined in claim 7, wherein the sleeve-like element contains a tapered bore therein, and the means operatively connected to said fingers for causing radial movement thereof comprises a tapered pin extending through said sleeve-like element, and a torque nut threadedly engaging the end of said tapered pin and abutting said sleeve-like element for causing relative axial movement between said pin and sleeve-like element with consequent radial movement of said fingers.

9. A universal joint comprising two members capable of being rotated with their axes angularly disposed with respect to one another, a pair of spaced arms located at the end of each of said rotatable members, diametrically opposed outer ball seats located in the arms of each of said rotatable members, said outer seats of one of said members being centered in the same plane with the outer seats of the other of said members but at right angles with respect thereto, two pairs of diametrically opposed balls each having a portion thereof received in one of said outer seats, and adjustable coupling means for joining said rotatable members and transmitting torque therebetween comprising a pair of axially aligned torque transmitting washer-like elements having separate and distinct inner ball seats for receiving each of said balls and preventing contact therebetween, said inner ball seats having portions thereof formed on the adjacent edges of said washer-like elements, and means operatively connected to said washer-like elements for causing movement thereof in a direction tending to preload said arms by simultaneously moving said balls and arms in an outward direction.

References Cited by the Examiner
UNITED STATES PATENTS

| | | | |
|---|---|---|---|
| 677,869 | 7/1901 | Kinsler | 64—17 |
| 1,307,674 | 6/1919 | Kiehne | 64—17 |
| 1,358,221 | 11/1920 | Leppert | 64—17 |
| 1,913,045 | 6/1933 | Wood | 64—17 |
| 2,286,498 | 6/1942 | Miller | 64—21 |
| 2,974,504 | 3/1961 | Johnson | 64—30 |

ROBERT C. RIORDON, *Primary Examiner.*